Figure 3:
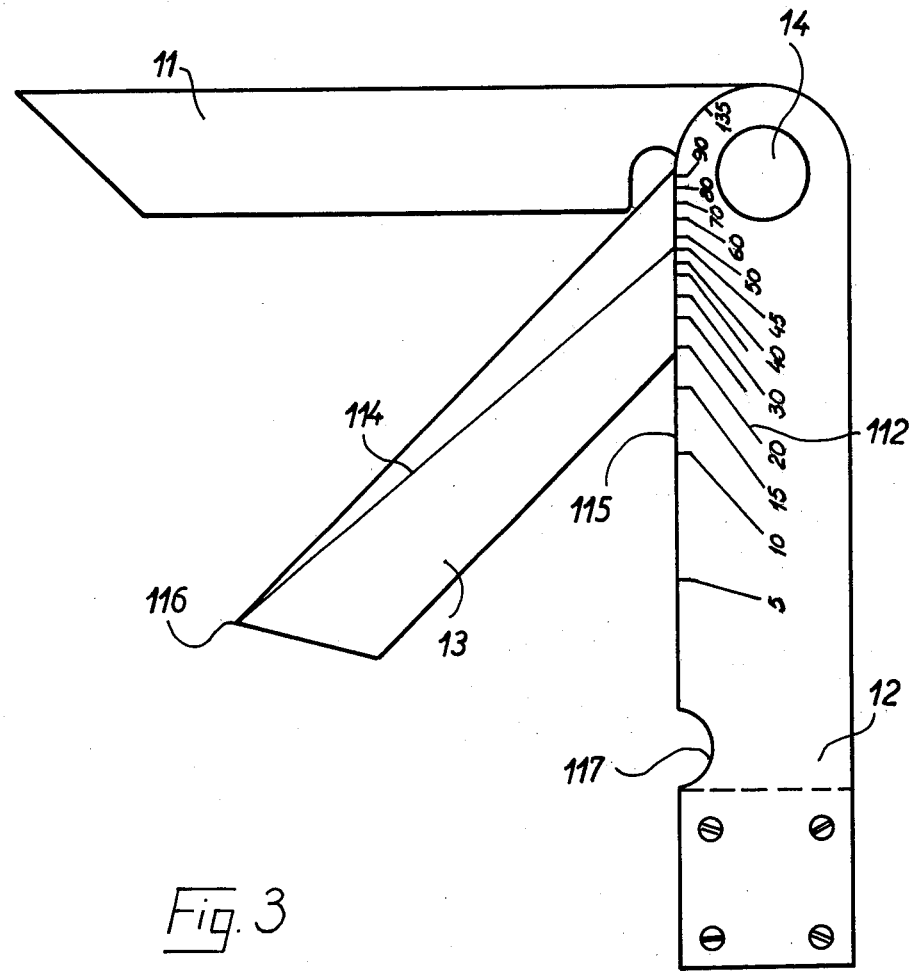

April 30, 1963  S. E. GRUNNING  3,087,249
DEVICE FOR INDICATING THE BISECTOR OF AN ANGLE
Filed Feb. 12, 1960  2 Sheets-Sheet 1
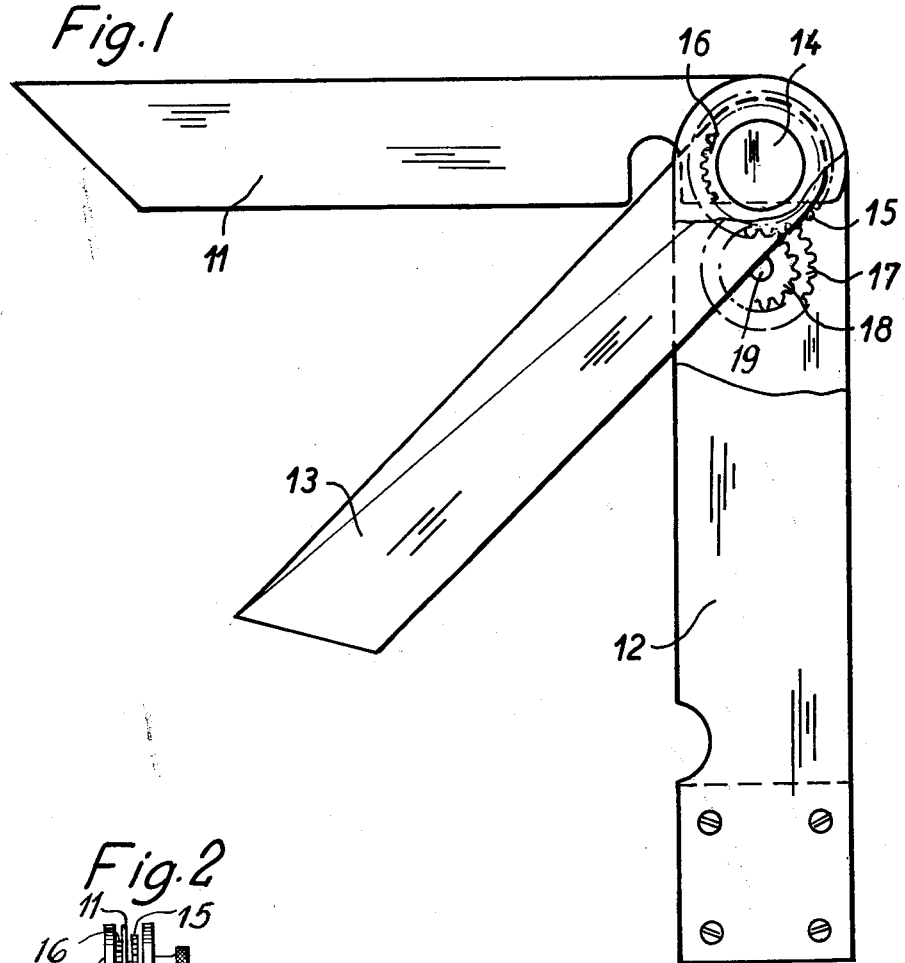
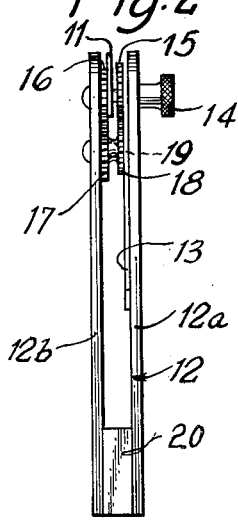
SVEN ELIS GRUNNING
INVENTOR
BY
Mason, Porter, Diller & Stewart
ATTORNEYS

United States Patent Office 3,087,249
Patented Apr. 30, 1963

3,087,249
DEVICE FOR INDICATING THE BISECTOR OF AN ANGLE
Sven Elis Grunning, Furuvagen 48, Sandviken, Sweden
Filed Feb. 12, 1960, Ser. No. 8,257
4 Claims. (Cl. 33—91)

The present invention relates to a device for indicating the bisector of an angle.

An object of the invention is to provide a device which is capable of indicating with accuracy the bisector of an arbitrary angle.

Another object is to provide a device which indicates the bisector without any members which could form hindrances to the marking of the bisector, e.g. at the joint line between boards, a metal piece or the like.

Still another object of the invention is to provide a dial, graduation or scale which facilitates determining the sizes of various angles.

The device according to the invention is mainly characterized in that it comprises three arms connected at a common end, wherein one outer arm and a middle arm indicating the bisector between the two outer arms are each provided with a cog wheel fastened to them, at least two cog wheels being concentrically fastened to the other outer arm and each engaging one of the said cog wheels, the number of the cogs of the cog wheel fastened to the middle arm being twice the number of the cogs of the cog wheel which is in engagement therewith and is fastened to the other outer arm.

The construction of the device according to the invention is illustrated by way of an example in the accompanying drawing, and the same will now be described with reference to this drawing.

FIGS. 1 and 3 are side views and FIG. 2 is an end view of the device.

The device shown consists of two outer arms 11, 12 and one middle or intermediate arm 13 adapted to indicate the bisector between the arms 11 and 13. The three arms 11, 12 and 13 are interconnected at one of their ends, respectively, suitably by means of a common axle of rotation 14. This arrangement offers the possibility of indicating the bisector of an arbitray angle without special adjusting means which could form hindrances to the easy use of the device.

Two gear or cog wheels 15 and 16 have a common axis of rotation together with the three arms 11, 12 and 13, the said cog wheels suitably having different numbers of cogs and possibly also radii. One, 15, of these cog wheels is suitably fastened unmovably to the middle arm 13 and another cog wheel is secured to an outer arm 11. Two further cog wheels 17, 18 are suitably rigidly fastened to each other and rotatably mounted upon a shaft 19 with a common axis of rotation on the other outer arm 12. These cog wheels 17, 18 are in constant engagement with the said cog wheels 15 and 16, respectively, cog wheel 15 with cog wheel 18 and cog wheel 16 with cog wheel 17.

The arm 13 is, as already mentioned, rigidly fastened to the cog wheel 15 (or 16) and thus rotatable together with this wheel. The number of the cogs of the wheel 15 shall be twice the number of the cogs of the wheel 18 engaging wheel 15, while the other cog wheels 16, 17 may have mutually the one and the same number of cogs.

If the arm 11 is swung in relation to the arm 12, the arm 13 will automatically be adjusted along the bisector of the angle formed between the arms 11 and 12. This circumstance is due to the number of cogs of the wheels 15 and 18 and the mutually equal number of cogs of the other wheels. The arm 12 may suitably be made with double walls, as is best disclosed by the two spaced parallel members 12a and 12b of FIGURE 2, in order to enclose a folded device. The arms may if necessary be maintained in spaced relation to each other by a spacing member 20, and be provided with suitable means, e.g. a screw device as illustrated in the drawing. The two spaced parallel members 12a and 12b engage the pivot member 14 adjacent opposite ends thereof, while the arms 11 and 13 engage the pivot member 14 intermediate the points of engagement of the two spaced parallel members 12a and 12b, as is best illustrated in FIGURE 2. This construction allows the arms 11 and 13 to be stored within the first arm 12 between the two spaced parallel members 12a and 12b thereof. The screw device may have a winged screw or nut if desired. The angle between the outer arms may be chosen between 0° and 360°.

The arms may be provided with suitable measure dials or scales. They may also have an angle meter or graduated arc. On the outer arm 12 there is a dial or scale 112 which corresponds to scale marks or lines arranged along a longitudinal edge of the said arm 12. The middle arm 13 has an index line 114. The angle between the arms 12 and 13 is indicated by the appropriate dial or scale mark making interference with the index line 114. This index line extends from the outer corner 116 of the arm 13 and forms an angle with the edges of the arm 13. Through this arrangement the measuring field will be very great, as angles can be read also between almost completely folded arms.

The double walls of the arm 12 have a recess 117 at the position of the ends of the arms 13 and 11 when folded into the arm 12, in order to facilitate opening the device.

The index line and the dial or scale may be applied on the arms in any manner known per se.

It is to be observed that the above embodiment is shown and described only as an example of the principle of the invention since other embodiments are possible within the scope of the invention.

Thus, the relative numbers of the cogs of the various cog wheels may be chosen other than those indicated above as the desired bisector indication may be obtained also, with other relations between the cog wheels. In some suitable relations the cog wheels 16 and 17 may have different sizes.

In special embodiments the middle arm, or perhaps arms, may be adapted to indicate other parts of angles than half angles, or the bisector as described above.

For obtaining indication of the bisector of an angle the number of the cogs of the cog wheels may be calculated according to the following scheme:

Cog wheel 16: $x$ cogs, $n$ angle degrees,
Cog wheel 17: $a \cdot x$ cogs, $n/a$ angle degrees,
Cog wheel 18: $y$ cogs, $n/a$ angle degrees,
Cog wheel 15:

$$\frac{2y}{a}$$

cogs, $n/2$ angle degrees

Ex.—$a=2$, $x=28$, $y=42$

In that way $a$ may be given any suitable value, and the cog numbers $x$ and $y$ may be calculated.

I claim:

1. A device for indicating the bisector of an angle, said device comprising first, second and third arms, and a pivot member connecting together said arms for relative pivoting movement, said first and second arms being adapted to engage a work piece with said third arm indicating the bisector of the angle of the work piece, a shaft carried by said first arm spaced from and parallel to said pivot member, a gear unit including two connected gears journalled on said shaft, and gears concentric with said pivot member and secured to said second and third arms and meshed with said gear unit to pivot said third arm in response to relative pivoting of said first and second arms, the ratio of drive of said gears being 2 to 1 whereby the angular movement of said second arm relative to said first arm is twice the angular movement of said third arm relative to said first arm.

2. The device of claim 1 wherein said first arm is formed of two spaced parallel members engaging said pivot member adjacent opposite ends thereof, and said second and third arms engaging said pivot member intermediate the points of engagement of said parallel members with said pivot member whereby said second and third arms may be stored within said first arm.

3. The device of claim 1 together with cooperating means on said first and third arms for indicating the bisected angle.

4. The device of claim 1 together with cooperating means on said first and third arms for indicating the bisected angle, said cooperating means including an index line on said third arm and an angle scale on said first arm.

References Cited in the file of this patent
UNITED STATES PATENTS

| | | |
|---|---|---|
| 833,133 | Howg | Oct. 9, 1906 |
| 1,095,149 | Hammer | Apr. 28, 1914 |
| 2,495,609 | Semrau | Jan. 24, 1950 |